O. SHUDOW.
AEROPLANE.
APPLICATION FILED MAR. 6, 1911.
1,228,705.
Patented June 5, 1917.
2 SHEETS—SHEET 2.
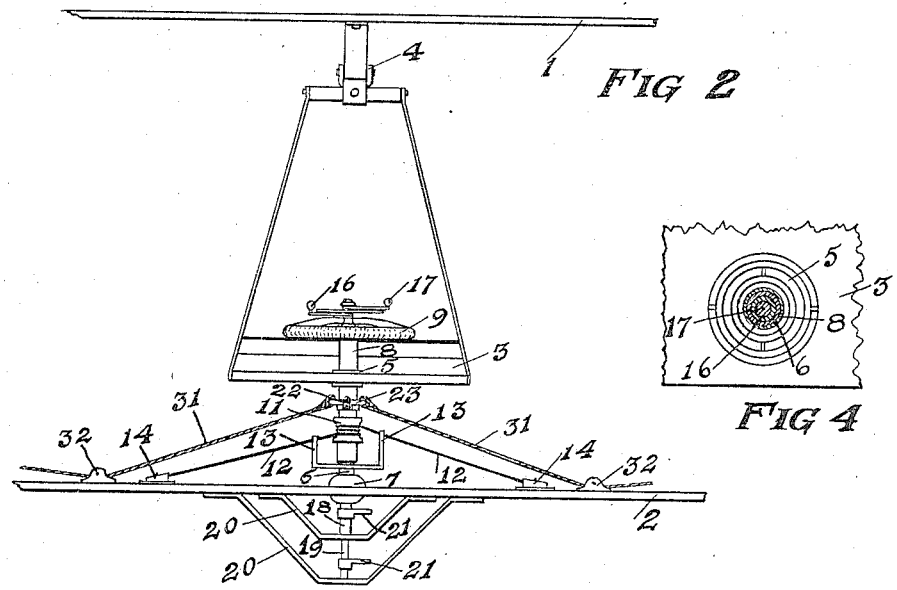
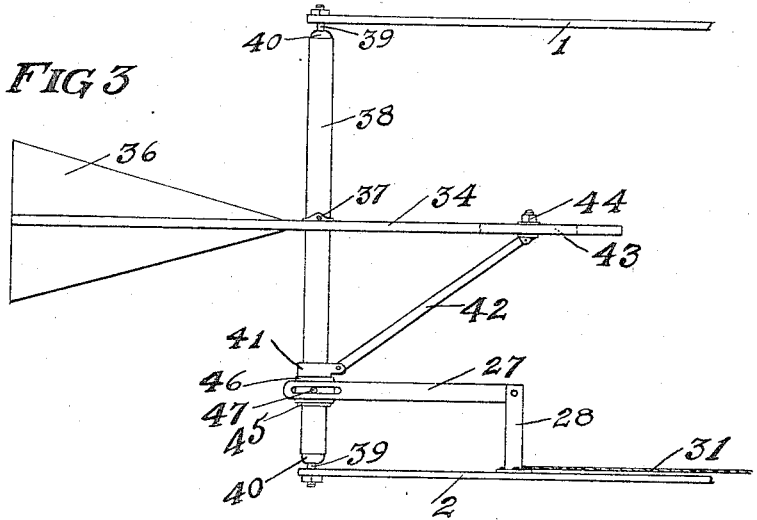
WITNESSES
H. E. Stone
J. W. Thrustin
INVENTOR
OSAM SHUDOW
BY Henry B. Lister
ATTORNEY

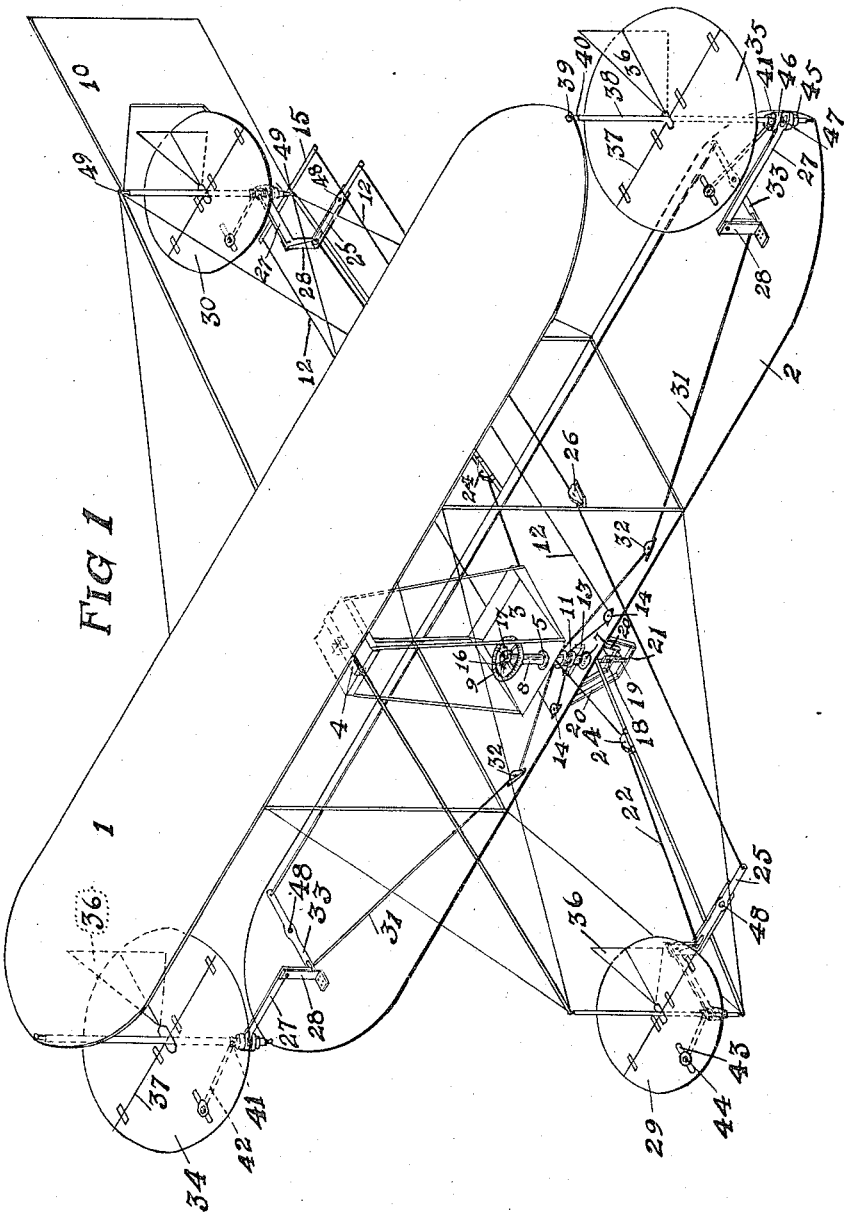

UNITED STATES PATENT OFFICE.

OSAM SHUDOW, OF SAN FRANCISCO, CALIFORNIA.

AEROPLANE.

1,228,705.    Specification of Letters Patent.    Patented June 5, 1917.

Application filed March 6, 1911. Serial No. 612,509.

*To all whom it may concern:*

Be it known that I, OSAM SHUDOW, a subject of the Emperor of Japan, residing at San Francisco, in the county of San Francisco, State of California, have invented certain new and useful Improvements in Aeroplanes, of which the following is the specification.

The invention relates to a balancing device by which control of the aeroplane may be automatic or manual at the will of the operator. The aeroplane is provided with a pendulum, capable of moving in any direction, in so far as its relation to the aeroplane is concerned. This pendulum is by preference the swing seat on which the operator is seated. The tendency of this pendulum will be to maintain a vertical position from the force of gravity. As the aeroplane moves from a true horizontal position, the pendulum or swing seat will continue in its vertical position and will consequently cease to be at right angles to the plane or planes. This change of relative position between the plane and pendulum is caused by my invention to change the angle of certain balancing planes. The balancing planes are preferably circular in form and capable of rotating on their axes and tilting diametrically. They are also provided with vertical vanes, whereby they may rotate to oppose the necessary angle toward the direction of the line of greatest resistance or concussion of wind. This will render the aeroplane automatically controllable in a violent storm or in case of a failure of the propeller force. In addition to this, I have a device for holding or moving the swing seat to any position within the arc of its oscillation if so desired by the operator, and the device also serves to prevent the annoyance of minor vibratory oscillations of the swing seat and for the steering of the aeroplane to render the use of the balancing device entirely subject to the will and control of the operator.

These and other objects and details of my invention will be fully described hereinafter and finally pointed out in the claims.

In the accompanying drawings, Figure 1 is a perspective view of an aeroplane showing the balancing device applied; Fig. 2, details of swing seat and control lever shaft with its connections; Fig. 3, a detailed side view of the balancing plane; Fig. 4, plan view of gimbal loose ring bearing and sectional view of concentric shaft through seat.

Referring to the drawing, I have shown a machine embodying my invention in one form, and the aeroplane surfaces or main planes 1 and 2 only to illustrate the construction and principle of operation of my invention, although the invention may be applied to a structure having a single plane or multiple planes.

The swing seat 3, hanging vertically from middle part of the upper plane 1 by means of gimbal joint 4, acts as a pendulum with an operator in it which normally occupies a horizontal position, and with a gimbal loose ring bearing 5 adapted to receive the universally movable control lever shaft 6, which is mounted on the joint 7 on the lower plane 2 to permit free movement of the shaft with the swing seat.

At the upper end of the vertical steering shaft 8 loosely fitting on the control lever shaft 6, there is provided a steering hand wheel 9, which, turning around on its axis actuates the vertical rudder 10 by means of a rope drum 11, around which passes a tiller rope 12, the ends of which, passing guides 13, under pulleys 14, are secured to the ends of a tiller lever 15.

The throttle and spark controls 16, 17, are fixed upon shafts 18, 19, that run inside the hollow control lever shaft 6, one upon the other, extending beneath the lower plane 2, through bearings 20, the frames of which are secured to the under side of the plane. Proper lengths about and at the joint 7 of the shafts 18, 19, are made flexible so as to permit free swinging movement of the control lever shaft 6, and the lower end of each of the shafts 18, 19 is provided with a lever 21 operating throttle and spark control means respectively by any suitable means.

The balancing ropes 22, 31 are connected with the control lever shaft 6 by means of a ring 23. The ring 23 has no vertical sliding movement, but is loose on the steering shaft 8 so that it will not be affected by turning the hand wheel 9. The vertical steering and longitudinal balancing ropes 22 from the ring 23, extending diagonally and passing under pulleys 24, are tied to the ends of the actuating levers 25 and the other ends of the levers are connected by a rope passing under pulley 26. The lateral balancing ropes 31 from the same ring 23, extending diagonally and passing under pulleys 32, and tied to the ends of the other actuating levers 33 and a rope connecting the other ends of the levers, form the lateral balancing connection. The constructions are such that the movement of the control lever shaft or swinging of the swing seat in one direction or the other will cause corresponding movement of certain balancing planes.

The balancing planes 29 and 30 are placed at the front and the rear of the aeroplane for the vertical steering and longitudinal balancing, and the planes 34 and 35, at the extreme ends of the main planes for the lateral balancing of the machine. Each balancing plane is preferably circular in form and pivoted or hinged a little in front of the center to the horizontal bar 37 which is fixed transverse to the center of a vertical rotatable shaft 38, to permit free tipping so as to be capable of forming an angle to the line of its normal plane. Each balancing plane is provided with a vertical tail or wind vane 36, whereby the tail side of the balancing plane will always swing around toward the direction in which the air current or wind is moving. Each shaft 38 is mounted on pivots 39 with ball bearings 40 so as to turn freely around a vertical axis, and around the lower part of said shaft and slidable on it only vertically, there is mounted a sleeve 41 with a connecting rod 42 hinged to and connecting the plane and the sleeve 41 as shown in Fig. 3.

The sleeve 41 is provided with ball bearings 45 to receive a loose ring 46 to permit the sleeve 41 to rotate freely so that the raising or lowering of the ring 46 changes the angle of the balancing plane on its horizontal axis independent of its rotary movement on its vertical axis from action of wind. The ring 46 is provided with pin 47 fitting in the sliding slot of the end of the bell crank lever 27 which is pivoted to the bracket 28, and the other end of the bell crank lever fits loosely in the slot of the actuating lever which is pivoted at 48. The balancing planes are balanced in weight at opposite sides so as not to be swung around from the force of gravity upon the tilting of the aeroplane; and the bearings 40 and 45 are anti-frictional types so that even just perceptible wind, upon striking the surface of the vertical tail 36, will swing it around its vertical axis bringing the tail side of the balancing plane toward the direction of wind. Each balancing plane normally occupies the position shown in Fig. 1 by the relative movement of the air in the form of wind blowing in the direction opposite to that in which the machine is traveling; but the other wind or gust from any other direction will swing around the balancing plane so as to change the position of each balancing plane according to the direction and strength of the wind so that any horizontal wind or gust acts as a balancing medium on the balancing planes.

The vertical rudder 10 mounted upon the pivots 49, with its tiller lever 15, to the ends of which the tiller rope 12 is attached, is for the means of steering the machine horizontally and also serves to maintain the lateral balance as hereinafter described.

It will thus be understood from the foregoing description that if the machine should tilt to an excessive extent laterally in one direction or the other, the operator, usually grasping the steering hand wheel 9 for the purpose of preventing the oscillations of swing seat 3 from numerous disturbing forces, releases his grasp upon the hand wheel 9 thus causing the swing seat 3 to assume horizontal position actuating the lateral balancing planes 34, 35, by means of lateral balancing ropes 31, to correct the lateral tilting tendency of the machine. The vertical rudder 10 is also actuated at the same time, by means of the tiller rope 12 connecting with the control lever shaft, so as to give the machine a tendency to swing about and cause the outer side of the main planes to move more rapidly through a larger arc to give more lifting effect to the tilted side of the aeroplane. If the machine should tilt forward or rearward, the swinging of the seat 3 actuates the longitudinal balancing planes 29, 30, to correct the tilting tendency. In like manner, the tipping of the machine to any angle may be automatically corrected.

The operation of the machine under ordinary conditions will only necessitate the operator keeping his hand lightly on the hand wheel, for the swinging of the seat will automatically maintain the equilibrium of the machine; while, flying in a gusty wind or violent storm, the operator should grasp the hand wheel tightly so as to assist in correcting any tendency to tilt.

The vertical steering and balancing planes 29, 30 are operated by the lever shaft moving in a fore and aft direction on the point 7 and at the same time moving the swing seat 3 on the gimbal joint 4. The horizontal steering is by means of the vertical rudder 10 actuated by the hand wheel turning around its vertical axis.

The oscillation of the swing seat 3 from the effect of wind pressure upon the operator can be readily suppressed by grasping the hand wheel 9 so as to prevent the control lever shaft 6 from moving with the wind; while, the pressure upon the operator from the front may rather assist the aeroplane to travel in a straight course by effecting the longitudinal balancing planes to change the angle of the main planes against various wind pressure, and the side winds have no effect on the swing seat for the pressure upon the operator will counterbalance with the pressure on the surface of the vertical rudder, and the wind from the back is prevented by the action of the propeller of the machine.

Various modifications may be made to the details of these devices without departing from the essential principles of my invention.

Having thus described my invention, what I claim as new, and desire to secure by Letters Patent, is—

1. In an aeroplane balancing control, the combination of a frame, an operator's swing seat attached to the frame, and a manually controlled lever mounted on the frame so as to move relative to the frame, and movably jointed to the seat, whereby the lever moves relative to the seat and frame as the former swings relative to the latter.

2. In an aeroplane balancing control, the combination of a frame, a universally movable swing seat attached to the frame, and a lever controlled from the seat and universally jointed to the frame and seat.

3. In an aeroplane balancing control, the combination of a frame, an operator's swing seat, and a lever operated from the seat and movably jointed to the frame and seat, for controlling the swinging movements of the seat.

4. In an aeroplane balancing control, the combination of a frame, an operator's swing seat attached to the frame, a control lever movably jointed to the frame and seat, whereby it is capable of coöperative control by the gravitation of the seat and manual control of the lever.

In testimony whereof, I have hereunto affixed my signature in the presence of two witnesses.

OSAM SHUDOW.

Witnesses:
K. T. McDonnell,
John W. Thresher.

Copies of this patent may be obtained for five cents each, by addressing the "Commissioner of Patents, Washington, D. C."